US010479510B2

(12) United States Patent
Borumand et al.

(10) Patent No.: US 10,479,510 B2
(45) Date of Patent: Nov. 19, 2019

(54) MODULAR ENVIRONMENTAL CONTROL CHAMBER

(71) Applicant: The Boeing Company, Chicago, IL (US)

(72) Inventors: Khashayar Borumand, Woodinville, WA (US); David C. Hass, Renton, WA (US); Randall S. Smith, Seattle, WA (US); Karl E. Schuster, Seattle, WA (US)

(73) Assignee: The Boeing Company, Chicago, IL (US)

( * ) Notice: Subject to any disclaimer, the term of this patent is extended or adjusted under 35 U.S.C. 154(b) by 430 days.

(21) Appl. No.: 15/292,102

(22) Filed: Oct. 12, 2016

(65) Prior Publication Data

US 2018/0099755 A1    Apr. 12, 2018

(51) Int. Cl.
| | |
|---|---|
| *B64D 13/08* | (2006.01) |
| *B64F 5/60* | (2017.01) |
| *B64D 13/06* | (2006.01) |
| *B64C 1/00* | (2006.01) |

(52) U.S. Cl.
CPC ............... *B64D 13/08* (2013.01); *B64F 5/60* (2017.01); *B64C 1/00* (2013.01); *B64D 2013/0662* (2013.01); *B64D 2013/0674* (2013.01)

(58) Field of Classification Search
None
See application file for complete search history.

(56) References Cited

U.S. PATENT DOCUMENTS

| | | | | | |
|---|---|---|---|---|---|
| 2,151,584 | A | * | 3/1939 | Bugatti | G01M 5/0016 73/583 |
| 2,383,491 | A | * | 8/1945 | Kemmer | G01M 5/0016 73/798 |
| 2,496,862 | A | * | 2/1950 | Del Mar | B64D 13/04 454/71 |

(Continued)

OTHER PUBLICATIONS

Extended European Search Report prepared by the European Patent Office in application No. 17185983.8 dated Mar. 3, 2018.

*Primary Examiner* — Avinash A Savani
*Assistant Examiner* — Martha M Becton
(74) *Attorney, Agent, or Firm* — McDonnell Boehnen Hulbert & Berghoff LLP

(57) ABSTRACT

An example modular environmental control chamber (MECC) includes an outer chamber formed by an outer chamber housing section enclosing an outer face of a section of fuselage and an inner chamber formed by an inner chamber housing section enclosing an inner face of the section of fuselage. An outer chamber airflow delivery and return system includes an outer chamber blower for directing temperature-controlled air to the outer chamber through an air inflow aperture of the outer chamber housing section and an outer chamber air return duct connected to an air outflow aperture of the outer chamber housing section. An inner chamber airflow delivery and return system includes an inner chamber blower for directing humidity-controlled air to the inner chamber through an air inflow aperture of the inner chamber housing section and an inner chamber air return duct connected to an air outflow aperture of the inner chamber housing section.

20 Claims, 8 Drawing Sheets

(56) References Cited

U.S. PATENT DOCUMENTS

| | | | | |
|---|---|---|---|---|
| 2,755,638 A * | 7/1956 | Sevin | B64D 13/08 | 62/402 |
| 2,808,658 A * | 10/1957 | Stern | G09B 9/206 | 434/52 |
| 3,424,231 A * | 1/1969 | Truhan | F24F 3/153 | 165/230 |
| 3,483,711 A * | 12/1969 | Malczewski | B64D 13/08 | 236/44 R |
| 3,592,120 A * | 7/1971 | Goetz | B64D 13/04 | 244/117 R |
| 3,740,905 A * | 6/1973 | Adams | B64C 1/067 | 165/231 |
| 3,825,723 A * | 7/1974 | Roeser | B01L 1/02 | 126/369 |
| 3,945,249 A * | 3/1976 | Knoth | G01N 3/08 | 73/819 |
| 4,228,759 A * | 10/1980 | Shinozuka | B63B 3/13 | 114/342 |
| 4,453,413 A * | 6/1984 | Schneider | G01M 5/005 | 73/802 |
| 4,460,822 A * | 7/1984 | Alden | F24C 15/327 | 126/20 |
| 4,461,155 A * | 7/1984 | Werjefelt | B64D 13/00 | 250/432 R |
| 4,602,503 A * | 7/1986 | Hile | G01R 31/2862 | 73/865.6 |
| 4,667,522 A * | 5/1987 | Kawahara | G01N 17/00 | 219/401 |
| 4,812,750 A * | 3/1989 | Keel | G01M 99/002 | 312/296 |
| 4,976,136 A | 12/1990 | Willan | | |
| 5,043,143 A * | 8/1991 | Shaw | G01N 35/00029 | 236/44 A |
| 5,188,169 A * | 2/1993 | Lim | F24F 3/153 | 165/122 |
| 5,195,384 A * | 3/1993 | Duesler, Jr. | G01M 99/002 | 73/865.6 |
| 5,257,088 A * | 10/1993 | Tyson, II | G01B 11/161 | 244/125 |
| 5,386,952 A * | 2/1995 | Nordstrom | B64C 1/067 | 244/118.1 |
| 5,404,747 A * | 4/1995 | Johnston | G01M 3/24 | 73/40 |
| 5,469,707 A * | 11/1995 | Dadachanji | G05D 22/02 | 62/176.6 |
| 5,631,429 A * | 5/1997 | Cutright | G01M 99/002 | 73/865.6 |
| 5,897,079 A * | 4/1999 | Specht | B64C 1/067 | 244/118.5 |
| 6,023,985 A * | 2/2000 | Fournier | G01N 33/0016 | 73/865.6 |
| 6,659,638 B1 * | 12/2003 | Hardcastel, III | G01N 3/60 | 236/49.3 |
| 8,176,844 B2 * | 5/2012 | Lichte | A47J 39/003 | 219/400 |
| 8,567,268 B2 * | 10/2013 | Sun | G05D 22/02 | 73/431 |
| 8,875,528 B2 * | 11/2014 | Immink | F24F 3/1405 | 236/12.1 |
| 9,227,730 B2 * | 1/2016 | Markwart | B64D 13/00 | |
| 9,365,279 B2 * | 6/2016 | Joern | B64C 1/067 | |
| 9,873,512 B2 * | 1/2018 | Mores | B64C 1/061 | |
| 9,889,939 B2 * | 2/2018 | Zhang | B64D 13/08 | |
| 10,067,044 B2 * | 9/2018 | Taba | G01N 3/08 | |
| 2005/0263949 A1 | 12/2005 | Boyl-Davis et al. | | |
| 2007/0227434 A1 | 10/2007 | Gotz et al. | | |
| 2008/0299887 A1* | 12/2008 | Scherer | B64D 13/06 | 454/71 |
| 2010/0186519 A1 | 7/2010 | Cerreta et al. | | |
| 2011/0234426 A1* | 9/2011 | Uhlendorf | G01M 3/3263 | 340/945 |
| 2016/0187247 A1* | 6/2016 | Rey | G01N 17/002 | 374/57 |

* cited by examiner

MODULAR ENVIRONMENTAL CONTROL CHAMBER

FIELD

The present disclosure generally relates to the testing of aircraft interiors under flight and ground conditions, and more particularly to a modular environmental control chamber to simulate different temperature and humidity conditions.

BACKGROUND

Moisture management is a common consideration in the design of commercial aircraft, as moisture inside the aircraft can condense on interior surfaces and lead to electrical equipment failures, corrosion, wet insulation, and other issues.

Although the humidity of air within a commercial aircraft in flight is typically low, it is generally not completely dry. For example, some moisture will be present in the air due in part to the respiration of the passengers. Most condensation of this moisture occurs during flight, when the outside air and the fuselage of the aircraft are very cold, typically below the freezing point of water and below the dew point of the interior cabin air. Accordingly, condensation often forms as frost when the moist air passes through small gaps in the insulation of the aircraft and comes into contact with the inner face of the fuselage.

Consequently, aircraft interiors and environmental control systems are designed to manage this accumulation of moisture and the eventual drainage of water that results when the frost on the inner face of the fuselage melts. For example, waterproof insulation blankets surrounding the cabin may shed dripping water toward pre-designed drainage channels. Felt treatments may also be positioned in some locations for collecting and evaporating moisture. However, it generally has not been possible to evaluate the efficacy of a given moisture management design developmentally. Rather, the moisture management design is usually installed on an aircraft and then tested under actual flight conditions. Consequently, corrections or improvements to the moisture management system are usually implemented in the manner of in-service troubleshooting, after the aircraft interior is already designed and built. This can present difficulties for phasing the development of a new aircraft design.

What is needed is a system to developmentally test for moisture accumulation in a simulated aircraft interior under controlled temperature and humidity conditions.

SUMMARY

In one example, a modular environmental control chamber (MECC) is described including an outer chamber formed by an outer chamber housing section enclosing an outer face of a section of fuselage, where the outer chamber housing section comprises an air inflow aperture and an air outflow aperture. An inner chamber is formed by an inner chamber housing section enclosing an inner face of the section of fuselage, where the inner chamber housing section comprises an air inflow aperture and an air outflow aperture, where the section of fuselage separates the outer chamber and the inner chamber, and where the outer chamber housing section and the inner chamber housing section are connected to form an outer boundary of the MECC. The MECC further includes an outer chamber airflow delivery and return system comprising i) an outer chamber blower for directing temperature-controlled air to the outer chamber through the air inflow aperture of the outer chamber housing section and ii) an outer chamber air return duct connected to the air outflow aperture of the outer chamber housing section. The MECC also includes an inner chamber airflow delivery and return system comprising i) an inner chamber blower for directing humidity-controlled air to the inner chamber through the air inflow aperture of the inner chamber housing section and ii) an inner chamber air return duct connected to the air outflow aperture of the inner chamber housing section.

In another example, a method of assembling a modular environmental control chamber (MECC) is described. The method includes connecting an inner chamber housing section to a section of fuselage, where the inner chamber housing section and an inner face of the section of fuselage form an inner chamber, and where the inner chamber housing section comprises an air inflow aperture and an air outflow aperture. The method further includes connecting an outer chamber housing section to the inner chamber housing section such that an outer face of the section of fuselage and the outer chamber housing section form an outer chamber, where the section of fuselage separates the inner chamber and the outer chamber, where the outer chamber housing section comprises an air inflow aperture and an air outflow aperture, and where the outer chamber housing section and the inner chamber housing section form an outer boundary of the MECC. The method also includes connecting, to the air inflow aperture of the outer chamber housing section, an outer chamber airflow delivery system comprising an outer chamber blower for directing temperature-controlled air to the outer chamber through the air inflow aperture of the outer chamber housing section and connecting, to the air inflow aperture of the inner chamber housing section, an inner chamber airflow delivery system comprising an inner chamber blower for directing humidity-controlled air to the inner chamber through the air inflow aperture of the inner chamber housing section.

In still another example, a method of simulating environmental conditions in an aircraft is described. The method includes directing temperature-controlled air into an outer chamber through an air inflow aperture of an outer chamber housing section, where the outer chamber housing section encloses an outer face of a section of fuselage thereby forming the outer chamber, and where the temperature-controlled air is directed across the outer face of the section of fuselage toward an air outflow aperture in the outer chamber housing section. The method further includes directing humidity-controlled air into an inner chamber through an air inflow aperture of an inner chamber housing section, where the inner chamber housing section encloses an inner face of the section of fuselage thereby forming the inner chamber, where the section of fuselage separates the outer chamber and the inner chamber, where the inner chamber housing section comprises an air outflow aperture through which the humidity-controlled air is drawn from the inner chamber, and where the outer chamber housing section and the inner chamber housing section are connected to form an outer boundary of a modular environmental control chamber.

The features, functions, and advantages that have been discussed can be achieved independently in various embodiments or may be combined in yet other embodiments, further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying Figures.

DETAILED DESCRIPTION

Disclosed embodiments will now be described more fully with reference to the accompanying Figures, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

Examples discussed herein include a modular environmental control chamber (MECC) for introducing different temperature and humidity conditions to a simulated aircraft environment. The MECC includes an inner chamber that approximates the interior of an aircraft, and which includes an interior moisture management system. The MECC also includes an outer chamber which approximates the exterior of the aircraft during flight and ground operations. By utilizing the MECC, temperature, humidity, and moisture conditions approximating flight and ground conditions may be simulated and measured, and the efficacy of a particular interior moisture management design may be evaluated. Further, changes to the designs may be implemented and applied at a developmental stage, rather than in a finished aircraft.

By the term "about" or "substantially" or "approximately" with reference to amounts or measurement values, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect that the characteristic was intended to provide.

Figure 1:
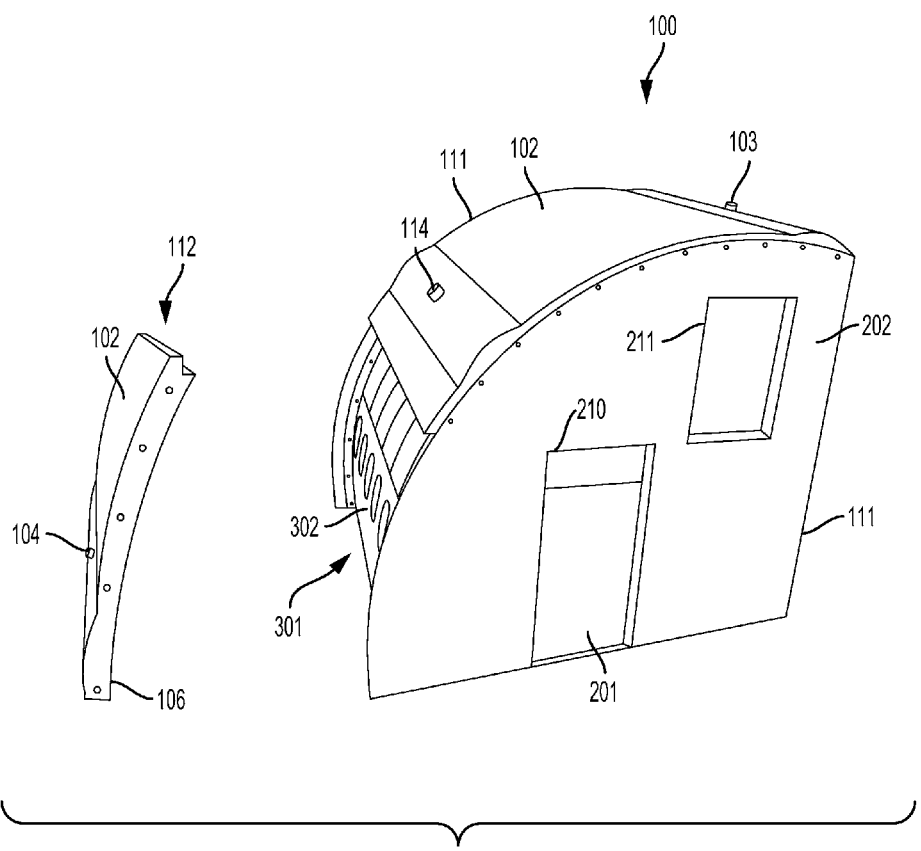
FIG. 1 illustrates an example modular environmental control chamber, according to an example implementation.

Referring now to FIG. 1, a MECC 100 is illustrated, according to an example embodiment. In FIG. 1, the MECC 100 is shown partially disassembled, as a portion 112 of an outer chamber housing section 102 is disconnected from the MECC 100, exposing a section of fuselage 301 within. The MECC 100 includes an outer chamber 101 formed by the outer chamber housing section 102 enclosing the outer face 302 of the section of fuselage 301. The outer chamber 101, which occupies the space between the outer face 302 of the section of fuselage 301 and an inner face 106 of the outer chamber housing section 102, may be seen with reference to FIG. 4, which depicts a cross section of the MECC 100.

FIG. 1 also illustrates an inner chamber 201 formed by an inner chamber housing section 202 enclosing an inner face 303 of the section of fuselage 301. The inner face 303 is not shown in FIG. 1, and can be seen in FIG. 2. The inner chamber housing section 202 shown in FIG. 1 includes the sidewalls of the MECC 100. Thus, the inner chamber 201 of the example MECC 100 shown in FIG. 1 is a room bounded by the section of fuselage 301 and the walls of the inner chamber housing section 202. Two openings 210, 211 are shown in the inner chamber housing section 202 for accessing the inner chamber 201. In some implementations, doors may be attached to the openings 210, 211. Other forms of access to the inner chamber 201 are also possible.

As shown in FIG. 1, the inner chamber housing section 202 is connected to the outer chamber housing section 102 to form an outer boundary 111 of the MECC 100. Within the MECC 100, the section of fuselage 301 separates the outer chamber 101 and the inner chamber 201. Consequently, the MECC 100 provides for the simultaneous environmental control of the two separate but adjacent chambers. This, in turn, may be used to simulate a range of environmental conditions for both the inner chamber 101 and outer chamber 201, including both flight and ground conditions, as further discussed below.

Moreover, in some implementations, the inner chamber housing section 202 and the outer chamber housing section 102 of the MECC 100 are removably connected. Additionally, both the outer chamber housing section 102 and the inner chamber housing section 202 may be comprised of several modular portions, such as the portion 112 shown in FIG. 1, each of which may also be removably connected to form the MECC 100. This may facilitate the ready assembly and disassembly of the MECC 100 in order to, for instance, replace or modify the section of fuselage or the interior moisture management design, install or maintain sensors located within the MECC 100, or move the MECC 100 to a different location, among other possibilities.

To further these capabilities of the MECC 100, the overall size of the MECC 100 may be sufficiently large that it provides reliable data to model the behavior of an aircraft's interior under test conditions, but not so large that the modular components, or the overall MECC 100, becomes unwieldy or inefficient. For example, the section of fuselage 301 may include a series of vertical frame bays. Each frame bay may have a width that includes one window of a typical aircraft, for instance.

Figure 2:
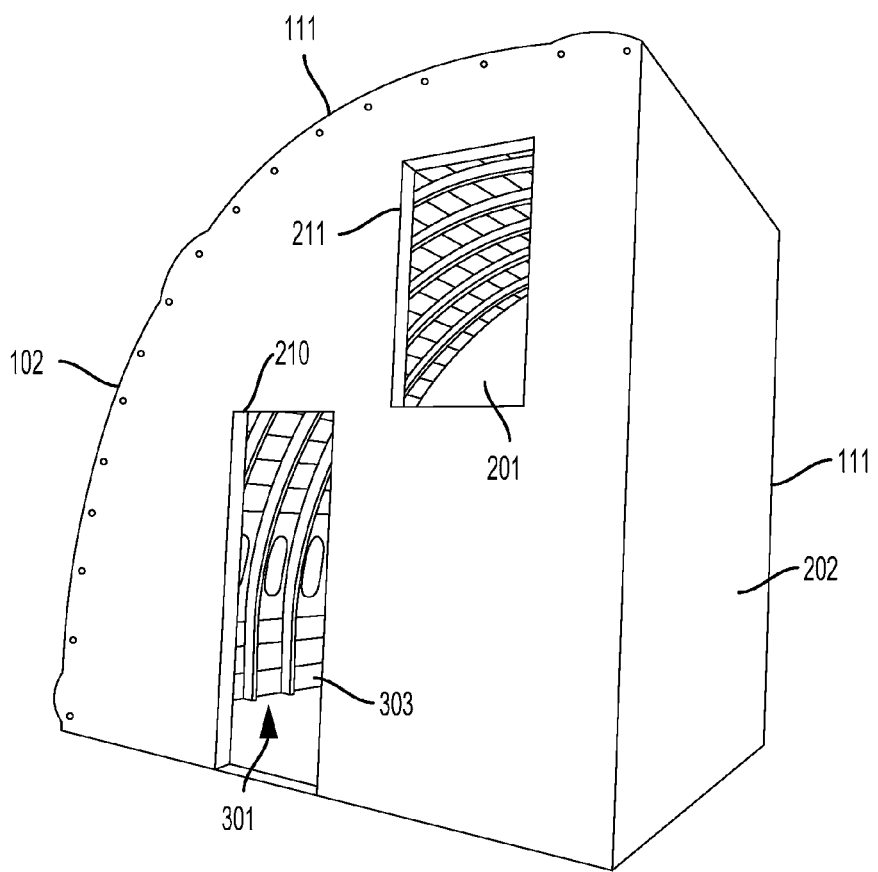
FIG. 2 illustrates another view of an example modular environmental control chamber, according to an example implementation.

FIG. 2 shows another view of the MECC 100, where the inner face 303 of the section of fuselage 301 can be seen through the openings 210, 211 in the inner chamber housing section 202. In FIG. 2, the vertical frame bays can be seen, with vertical supports dividing each bay and separating the windows. The example MECC 100 shown in FIGS. 1-4 includes six frame bays (although not every frame bay is visible due to the perspective shown in the Figures). A greater or lesser number of frame bays is also possible. However, too few frame bays, such as one or two, may provide too small of a sample area on the inner and outer faces of the section of fuselage 301, and too small of a sample volume within the inner chamber 201 to reliably model the behavior of a fully assembled aircraft. Conversely, too many frame bays, such as twelve or more, may be more than necessary to obtain relatively accurate modeling data for the section of fuselage 301 and inner chamber 201. Thus, a MECC with excessive frame bays may be inefficient in both its use of materials as well as the power and resources used to operate it.

The section of fuselage 301 further includes a series of parallel horizontal supports, or stringers, which can also be seen in FIG. 2. As with the vertical frame bays, a section of fuselage 301 that contains too few stringers, such as four or five, might not be large enough to accurately simulate the environmental conditions within an aircraft. On the other hand, the section of fuselage 301 within the MECC might not encompass the entire circumference of the aircraft body. For example, an object of the example MECC 100 may be to model and test the environmental conditions within the passenger cabin of an aircraft. The area below the floor in an aircraft may be a separate compartment with different temperature, pressure, and humidity thresholds, and different environmental control systems than the passenger cabin. Therefore, in some cases, it may be convenient, cost-effective, or otherwise desirable to model only the passenger cabin without modeling the adjacent below-floor area. Thus, the interior portion of the aircraft below the floor of the passenger cabin is not included in the example MECC 100.

In other implementations, an example MECC may be constructed to include the area below the floor of the passenger cabin in order to test how this area behaves, and to test whether and how this area may interact with the passenger cabin, during modeled air and ground operations. For example, the below-floor area may include a second inner chamber, distinct from the inner chamber 201, with a separate air delivery and return system for regulating environmental conditions in the second inner chamber, as well as components to provide for a lower pressure than in the inner chamber 201. Other variations are also possible.

Additionally, because many aircraft are substantially symmetric about their vertical centerline, at least for purposes of environmental control and moisture management within the aircraft, it may be assumed that the environmental conditions within the aircraft will be similar on either side of this line of symmetry. Therefore, it may be possible to model one half of the aircraft interior about this line of symmetry and still obtain reliable results.

Consequently, the section of fuselage 301 shown in the example MECC 100 in FIGS. 1-2 encompasses an arc spanning slightly more than 90 degrees, extending just past what would be the vertical centerline of the aircraft. It includes about 25-30 stringers (although not every stringer is visible in FIG. 2).

Returning to FIG. 1, the outer chamber housing section 102 comprises an air inflow aperture 103 and an air outflow aperture 104 to facilitate the environmental control of the outer chamber 101. In FIG. 1, the air inflow aperture 103 is shown at approximately the top of the arc of the outer chamber housing section 102, although other locations are also possible. The air outflow aperture 104 is shown on the disconnected portion 112 of the outer chamber housing section 102, and thus it would be located at the bottom of the arc of the outer chamber housing section 102 when the MECC 100 is fully assembled (as shown in FIGS. 3-4).

In some implementations, the MECC 100 may include more than one air inflow or air outflow aperture. For instance, the example MECC 100 shown in FIG. 1 includes a second air inflow aperture 114 at approximately the midpoint of the arc of the outer chamber housing section 102. Whether there is one air inflow aperture 103 or more than one, the airflow may be regulated such that a uniform temperature is achieved across the outer face 302 of the section of fuselage 301. For example, the outer face 302 of the section of fuselage 301 may include an array of thermocouples for monitoring the temperature at different points on the outer face 302.

Figure 3:
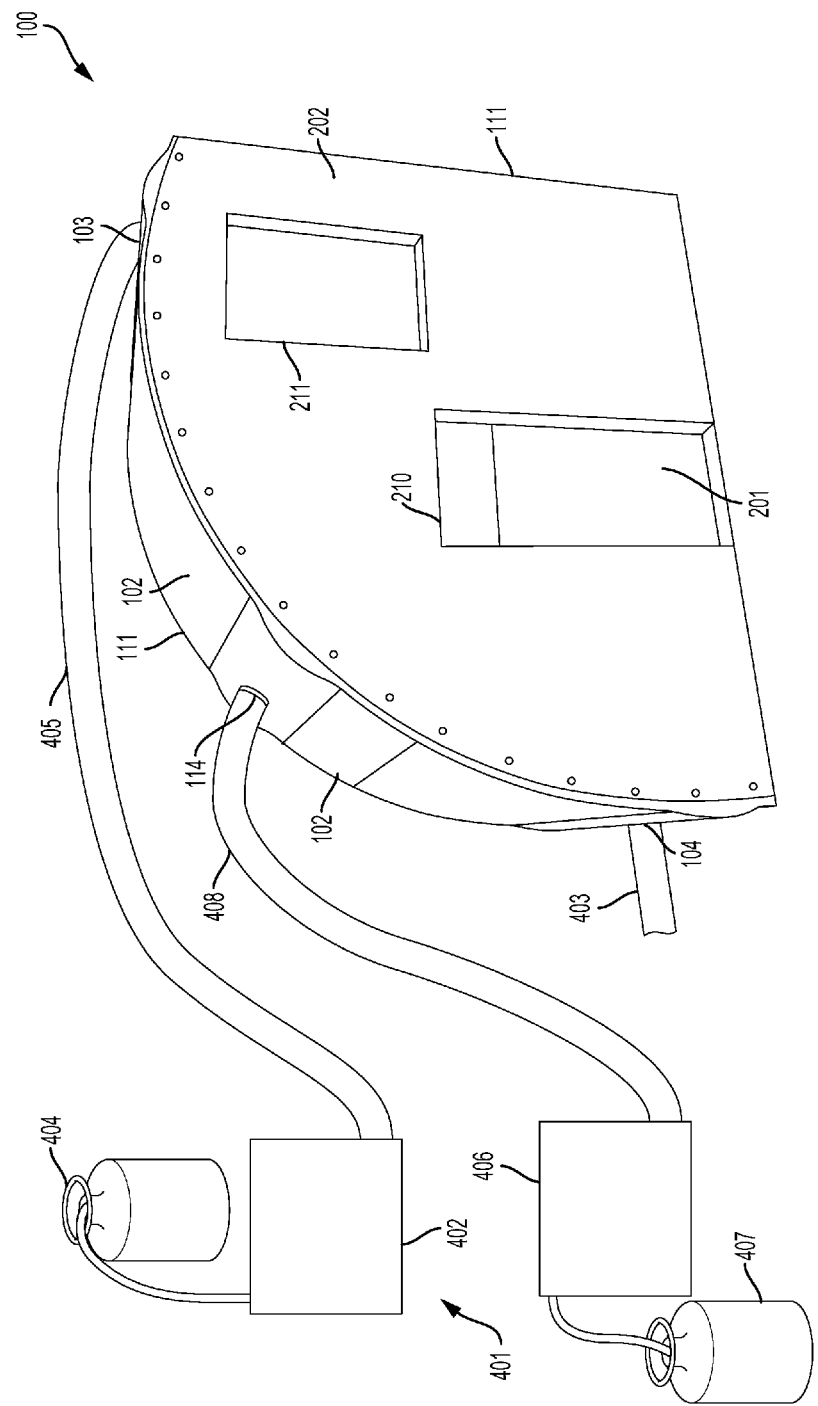
FIG. 3 illustrates another view of an example modular environmental control chamber, according to an example implementation.
Figure 4:
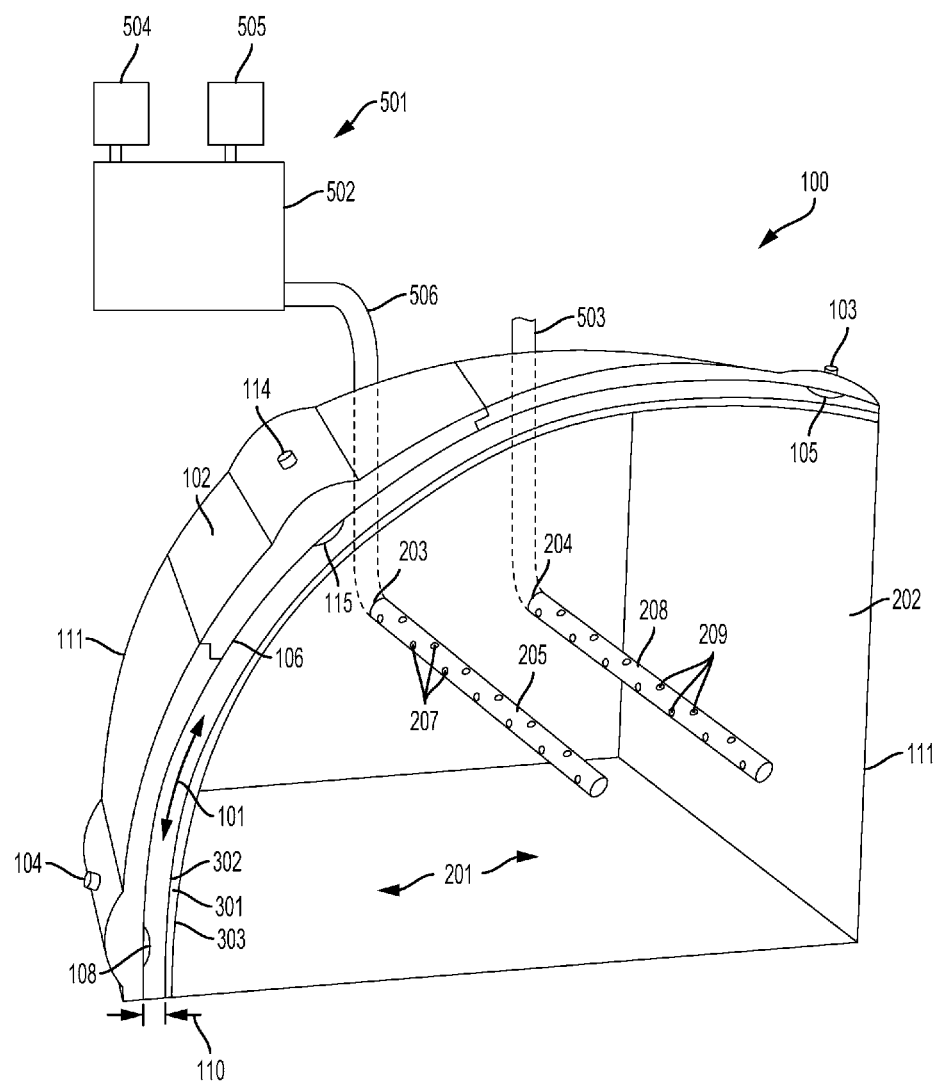
FIG. 4 illustrates another view of an example modular environmental control chamber, according to an example implementation.

Turning to FIG. 3, the example MECC 100 is shown with the portion 112 of the outer chamber housing section 102 connected. FIG. 3 also illustrates an outer chamber airflow delivery and return system 401 for controlling the environmental conditions within the outer chamber 101. The outer chamber 101 can be seen more clearly in FIG. 4. The outer chamber airflow delivery and return system 401 includes an outer chamber blower 402 for directing temperature-controlled air to the outer chamber 101 through the air inflow aperture 103 of the outer chamber housing section 102. The outer chamber blower 402 may be, for example, a fan configured to push temperature-controlled air through an outer chamber inflow duct 405 to the air inflow aperture 103. Other forced-air mechanisms are also possible.

In some implementations, in order to simulate the relatively low temperatures found at higher altitudes, the outer chamber airflow delivery and return system 401 may include a refrigerant 404 for cooling the temperature-controlled air that is directed to the outer chamber 101 through the air inflow aperture 103 of the outer chamber housing section 102. For example, the temperature-controlled air may cool the outer face 302 of the section of fuselage 301 to −60 degrees Fahrenheit, approximating the ambient exterior temperature at some cruising altitudes. In some cases, liquid nitrogen may be used for the refrigerant 404, and thus a compressor might not be required. This may contribute to the ease of assembly, disassembly, and relocation of the example MECC 100. Other refrigerants are also possible.

Additionally, the outer chamber airflow delivery and return system 401 may include a heating element to heat, rather than cool, the temperature-controlled air that is forced into the outer chamber 101. For instance, it may be desirable to simulate ground conditions for an aircraft in a relatively hot climate. For this reason, the outer chamber airflow delivery and return system 401 may be outfitted to switch between cooling and heating conditions. Other possibilities also exist.

As noted above, the outer chamber housing section 102 may include more than one air inflow aperture, such as the second air inflow aperture 114 shown in example MECC 100 of FIGS. 1 and 3. Accordingly, the outer chamber airflow delivery and return system 401 may include a second outer chamber blower 406, a second refrigerant 407, and a second outer chamber inflow duct 408. Alternatively, the second outer chamber inflow duct 408 may be connected to the outer chamber blower 402 and refrigerant 404. Other arrangements are also possible.

Additionally, the outer chamber airflow delivery and return system 401 includes an outer chamber air return duct 403 connected to the air outflow aperture 104 of the outer chamber housing section 102. FIG. 3 illustrates the outer chamber air return duct 403, which allows the temperature-controlled air to exit the outer chamber 101 after it has cooled, or heated, the space within. The outer chamber air return duct 403 may discharge to the exterior of the MECC 100, it may be further routed to an exhaust system, or it may be connected to a fan or other mechanism for creating relatively lower air pressure to draw the temperature-controlled air out of the outer chamber 101. In some implementations, the air return duct 403 may be routed back to the blower 402, creating a closed loop. Other possibilities also exist.

FIG. 4 illustrates another view of the example MECC 100, where the front wall of the inner chamber housing section 202 is not shown. As discussed above, the outer face 302 of the section of fuselage 301 is convex in shape, and the outer chamber housing section 102 is approximately parallel to the outer face 302 of the section of fuselage 301. In this example, the outer chamber 101 comprises an approximately uniform depth 110 between the outer face 302 of the section of fuselage 301 and the inner surface 106 of the outer chamber housing section 102. For instance, in the example MECC 100 discussed in the examples herein, the approximately uniform depth 100 is four inches. In other implementations, the approximately uniform depth 110 may be within the range of two to ten inches.

Similar to the outer chamber housing section 102, the inner chamber housing section 202 includes an air inflow aperture 203 and an air outflow aperture 204. These two apertures 203, 204 are depicted on the rear wall of the inner chamber housing section 202 in FIG. 4.

Further, FIG. 4 illustrates an inner chamber airflow delivery and return system 501, which includes an inner chamber blower 502 for directing humidity-controlled air to the inner chamber 201, through the air inflow aperture 203 of the inner chamber housing section 202. As above, the inner chamber blower 502 may be a fan or any other mechanism for generating a positive air pressure to force the humidity-controlled air through an inner chamber inflow duct 506 to the air inflow aperture 203.

The inner chamber airflow delivery and return system 501 may also include a humidifier 504 for conditioning the humidity-controlled air that is directed to the inner chamber 201 through the air inflow aperture 203 of the inner chamber housing section 202. For example, it may be desirable to adjust the humidity of the air in the inner chamber 201 in conjunction with the temperature changes that are introduced to the outer chamber 101. This may simulate flight conditions under which condensation occurs within the inner chamber 201. This, in turn, may provide data for the design of insulation, drainage, and other moisture management systems for the interior of an aircraft.

Additionally, the inner chamber airflow delivery and return system 501 may include a dehumidifier 505 for conditioning the humidity-controlled air that is directed to the inner chamber 201. In some cases, the ambient air within the MECC 100 may be more humid than the desired test conditions, and therefore dehumidified air may be necessary. One or both of the humidifier 504 and dehumidifier 505 may be used depending on the needs of a particular test. For example, the inner chamber airflow delivery and return system 501 may maintain a relative humidity of 10-30% within the inner chamber 201 to simulate cruising conditions, and later maintain a relative humidity of 50-80% within the inner chamber 201 to simulate ground conditions. Other humidity levels may also be desirable depending on the goals of a particular test.

In some implementations, the humidifier 504 and dehumidifier 505 may be jointly incorporated into the inner chamber airflow delivery and return system 501, such that they utilize the same inner chamber blower 502 and inner chamber inflow duct 506, as shown in FIG. 4. In other examples, humidified air and dehumidified air may be supplied to the inner chamber through two different air inflow apertures in the inner chamber housing section 202. Other possibilities exist.

Further, the inner chamber airflow delivery and return system 501 may include one or both of a refrigerant and a heating element for conditioning the temperature of the incoming air to the inner chamber 201. For instance, the inner chamber airflow delivery and return system 501 may maintain a temperature of 75 degrees Fahrenheit in the inner chamber 201, while the outer chamber 101 is cooled to much lower temperatures.

The inner chamber airflow delivery and return system 501 also includes an inner chamber air return duct 503 connected to the air outflow aperture 204 of the inner chamber housing section 202. In FIG. 4, both the inner chamber inflow duct 506 and the inner chamber air return duct 503 are connected to the back of the example MECC 100 as pictured, as are therefore shown partially with broken lines to indicate where they are hidden from view. As with the air outflow from the outer chamber 101 discussed above, the inner chamber air return duct 503 may be connected to a fan or other mechanism outside the MECC 100 for drawing air out of the inner chamber 201. In conjunction with humidity-controlled air that is supplied from the air inflow aperture 203, controlling the rate at which air is drawn from the inner chamber 201 may allow for more control over the air pressure within the inner chamber 201, which may be desirable in some test conditions. For example, the rate at which air is drawn through the air outflow aperture 204 may be approximately equal to the rate of air inflow through the air inflow aperture 203, resulting in a substantially constant overall air pressure in the inner chamber 201.

In some implementations, because the inner chamber 201 is relatively larger than the outer chamber 101, it is also possible that the inner chamber airflow delivery and return system 501 may be incorporated within the inner chamber 201. In such an example, the air inflow aperture 203 and air outflow aperture 204 might not be needed for the humidity-controlled airflow delivery and return as discussed above.

Within the inner chamber 201 of the example MECC 100 shown in FIG. 4, the air inflow aperture 203 is in fluid connection with an air inflow manifold 205 for distributing the humidity-controlled air within the inner chamber 201. The air inflow manifold 205 includes a plurality of openings 207, through which the humidity-controlled air may pass in a relatively uniform fashion. This may provide for a relatively uniform air pressure throughout the inner chamber 201, which might be more difficult to achieve if the humidity-controlled air were forced into the inner chamber 201 from a single, concentrated location.

Similarly, the air outflow aperture 204 of the inner chamber 201 shown in FIG. 4 is in fluid connection with an air outflow manifold 208 including a plurality of openings 209, through which the air is drawn. Again, the air outflow manifold 208 may facilitate a more uniform air pressure within the inner chamber 201, rather than a concentrated point of low pressure which might result if all of the return air is drawn from the inner chamber 201 at a single location, such as the air outflow aperture 204.

Figure 5:
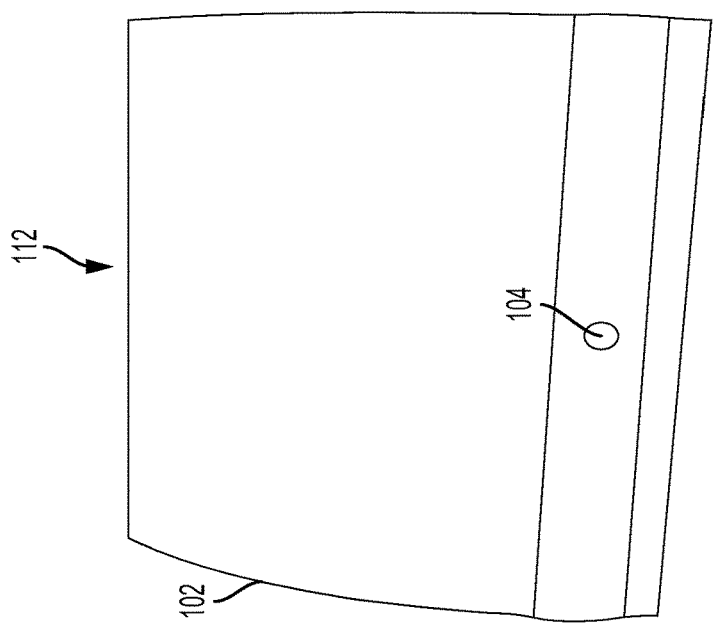
FIG. 5 illustrates an outer surface of an outer chamber housing section of a modular environmental control chamber, according to an example implementation.

FIG. 5 illustrates another view of the disconnected portion 112 of the outer chamber housing section 102 shown in FIG. 1, showing the outer surface of the outer chamber housing section 102. As discussed above, the air outflow aperture 104 is positioned near the bottom of the outer chamber housing section 102.

Figure 6:
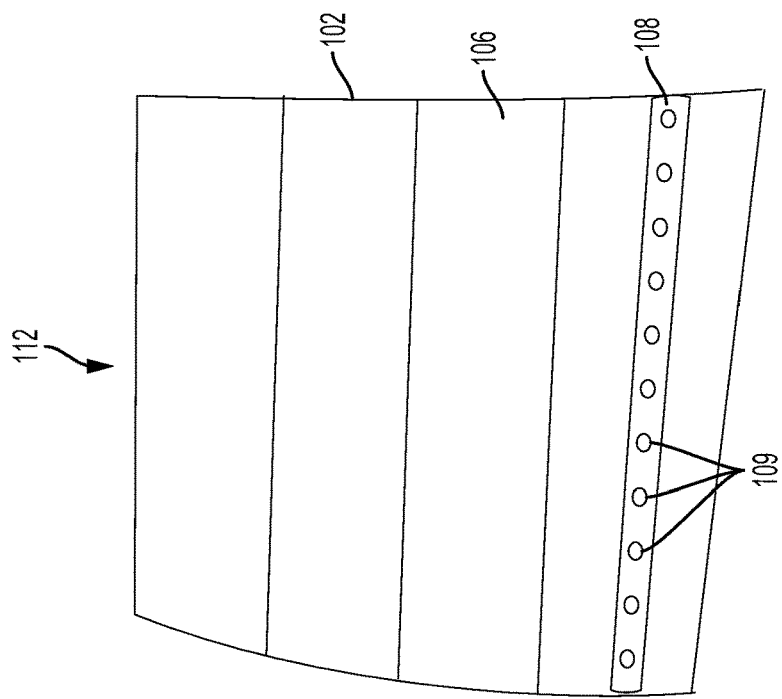
FIG. 6 illustrates an inner surface of the outer chamber housing section shown in FIG. 5.

FIG. 6 illustrates a reversed view of FIG. 5, such that the inner surface 106 of the outer chamber housing section 102 is visible. In this example, the air outflow aperture 104 of the outer chamber housing section 102 is in fluid connection with an air outflow manifold 108 on the inner surface 106 of the outer chamber housing section 102. The air outflow manifold comprises a second plurality of openings 109 for receiving and transmitting the temperature-controlled air out of the outer chamber 101. The second plurality of openings 109 is oriented approximately normal to the curvature of the outer chamber housing section 102. Accordingly, the second plurality of openings 109 are also oriented approximately normal to the outer face 302 of the section of fuselage 301.

Figure 7:
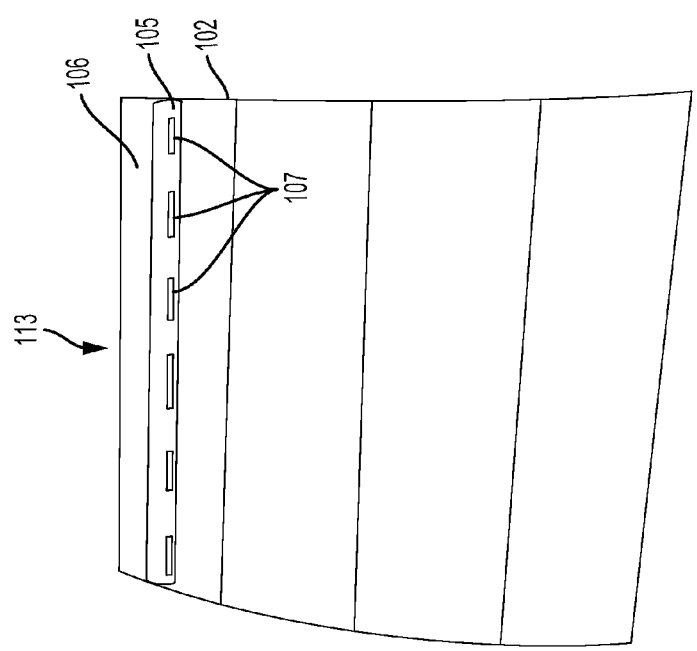
FIG. 7 illustrates an inner surface of another outer chamber housing section of a modular environmental control chamber, according to an example implementation.

FIG. 7 illustrates another portion 113 of the outer chamber housing section 102 that is similar to the portion 112 shown in 6. However, the portion 113 shown in FIG. 7 corresponds to the top portion of the arc that makes up the outer chamber housing section 102, and thus includes the air inflow aperture 103. Similar to the air outflow aperture 104, the air inflow aperture 103 is in fluid connection with an air inflow manifold 105 on the inner surface 106 of the outer chamber housing section 102, as shown in FIG. 7. However, the manifold 105 includes a first plurality of openings 107 that is positioned to direct airflow from the air inflow aperture 103 across the outer face 302 of the section of fuselage 301 toward the air outflow aperture 104 of the outer chamber housing section 102.

For example, the first plurality of openings 107 shown in FIG. 7 includes a series of slits, positioned near the bottom portion the air inflow manifold 105. As shown in cross-sectional view of FIG. 4, the air inflow manifold 105 opposite the air inflow aperture 103 may have a semi-circular profile. Thus, the first plurality of openings 107 is positioned to direct airflow downward, approximately tangential to the outer face 302 of the section of fuselage 301 and toward the air outflow aperture 104 at the bottom of the outer chamber 101. A second air inflow manifold 115, opposite the air inflow aperture 114, may include a similar arrangement. In order to achieve a uniform temperature across the outer face 302, as discussed above, the arrangement of the air inflow manifold 105 may be adjusted, or the rate of airflow through the manifold 105 may be modified, among other possibilities.

In some implementations, the thickness of the outer chamber housing section 102 may be increased at the location of the air inflow and outflow manifolds. This can been seen in the example MECC 100 shown in FIGS. 1-4, where the outer surface of the outer chamber housing section 102 protrudes slightly at each respective manifold location. This coincides with the locations of the air inflow and outflow apertures, and facilitates the transition from a concentrated, forced air flow in the delivery duct to a more diffused flow through the manifold, and vice versa.

Finally, the interior components of an aircraft's moisture management systems may be installed within the inner chamber 201 of the MECC 100. For example, insulation blankets may be added to the inner face 303 of the section of fuselage 301, along with other moisture management materials such as felt treatments and other linings to capture and direct water that may condense on the inner face 303. Further, a ceiling, overhead bins, and other structures may be added to the inner chamber 201 to approximate the structures within an actual aircraft.

In some implementations, a platform may be installed within the inner chamber 201 to provide easier access to the top-most portions of the section of fuselage 301, or the "crown" of the inner chamber 201. The opening 211 in the inner chamber housing section 202 may provide direct access to such a platform, via an exterior ladder or stairway, for example. In some examples, the platform may be situated above the ceiling that may be installed within the inner chamber 201. Other examples and arrangements are also possible.

When the example MECC is assembled an operated, condensation rates within in the inner chamber may be measured and the temperature and humidity of the respective MECC chambers are adjusted. Further, the effectiveness of a given moisture management system may be evaluated, and improvements may be made. As noted above, the MECC thus allows for the developmental design and refinement of interior moisture management systems without the need to construct an entire aircraft, much less perform an actual flight test with a fully designed and constructed aircraft. Rather, moisture management designs can be tested, improved, and implemented into final aircraft designs more efficiently.

Figure 8:
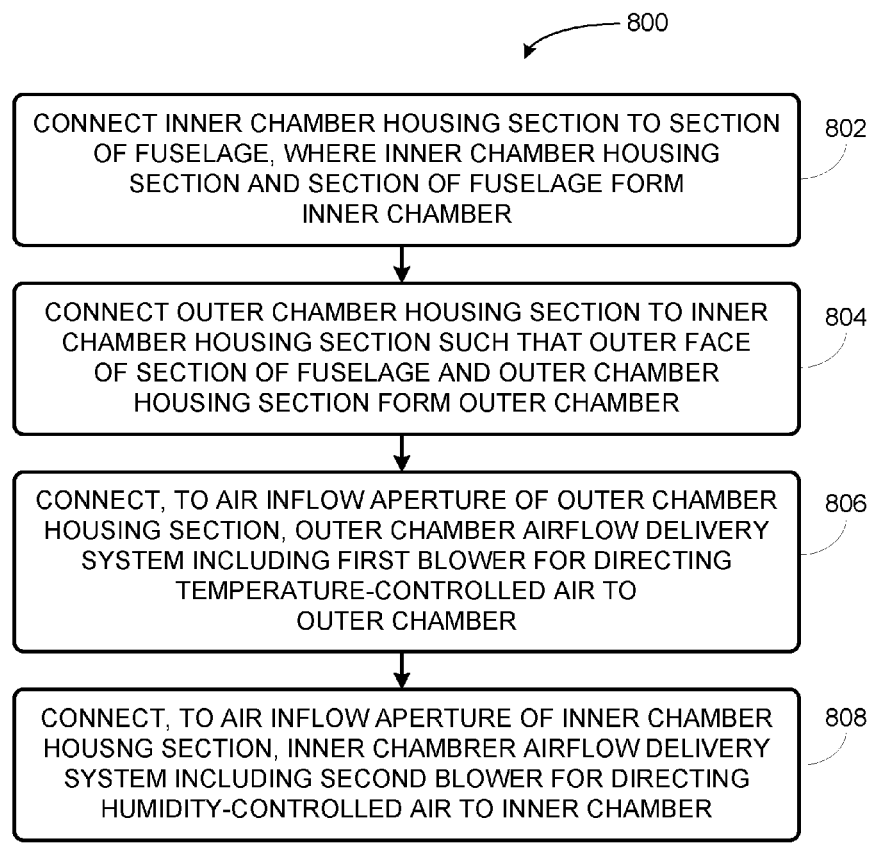
FIG. 8 shows a flowchart for assembling a modular environmental control chamber, according to an example implementation.

FIG. 8 shows a flowchart of an example method 800 for assembling a modular environmental control chamber (MECC), according to an example embodiment. Method 800 shown in FIG. 8 presents an embodiment of a method that, for example, could be used with the MECC 100 as shown in FIGS. 1-4 and discussed herein, for example. It should be understood that for this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 802, the method 800 includes connecting an inner chamber housing section 202 to a section of fuselage 301. As discussed above, the inner chamber housing section 202 and an inner face 303 of the section of fuselage 301 form an inner chamber 201, and the inner chamber housing section 202 comprises an air inflow aperture 203 and an air outflow aperture 204.

At block 804, the method includes connecting an outer chamber housing section 102 to the inner chamber housing section 202 such that an outer face 302 of the section of fuselage 301 and the outer chamber housing section 102 form an outer chamber 101. The section of fuselage 301 separates the inner chamber 201 and the outer chamber 101. The outer chamber housing section 102 includes an air inflow aperture 103 and an air outflow aperture 104. The outer chamber housing section 102 and the inner chamber housing section 202 form an outer boundary 111 of the MECC 100.

At block 806, the method 800 includes connecting, to the air inflow aperture 103 of the outer chamber housing section 102, an outer chamber airflow delivery system 401 including an outer chamber blower 402 for directing temperature-controlled air to the outer chamber 101 through the air inflow aperture 103 of the outer chamber housing section 102.

At block 808, the method 800 includes connecting, to the air inflow aperture 203 of the inner chamber housing section 202, an inner chamber airflow delivery system 501 including an inner chamber blower 502 for directing humidity-controlled air to the inner chamber 201 through the air inflow aperture 203 of the inner chamber housing section 202.

Further, the method 800 may include connecting an outer chamber air return duct 403 to the air outflow aperture 104 of the outer chamber housing section 102, and also connecting an inner chamber air return duct 503 to the air outflow aperture 204 of the inner chamber housing section 202.

Additionally, some examples the method 800 may include connecting an air inflow manifold 105 to the inner surface 106 of the outer chamber housing section 102 such that the air inflow manifold 105 is in fluid connection with the air inflow aperture 103 of the outer chamber housing section 102. The air inflow manifold 105 includes a plurality of openings 107 positioned to direct airflow from the air inflow aperture 103 across the outer face 302 of the section of fuselage 301 toward the air outflow aperture 104 of the outer chamber housing section 102.

Figure 9:
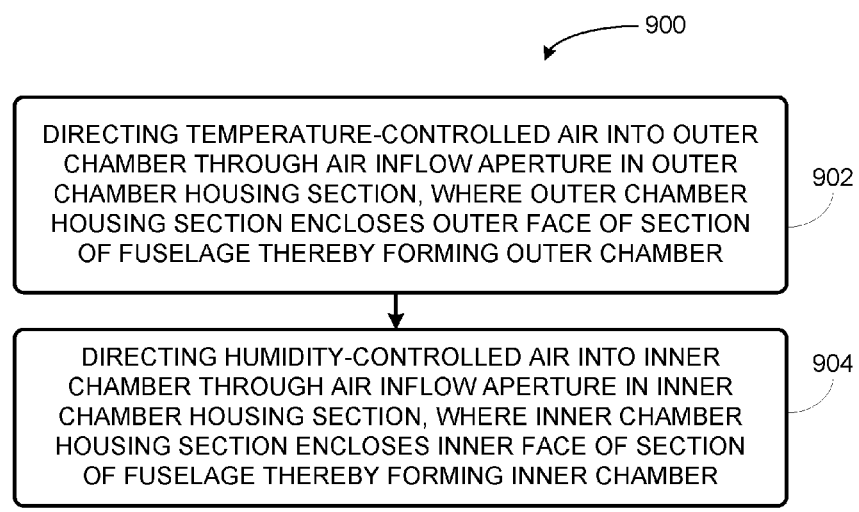
FIG. 9 shows a flowchart for simulating environmental conditions in an aircraft, according to an example implementation.

FIG. 9 shows a flowchart of an example method for simulating environmental conditions in an aircraft, according to another example embodiment.

At block 902, the method 900 includes directing temperature-controlled air into an outer chamber 101 through an air inflow aperture 103 of an outer chamber housing section 102. The outer chamber housing section 102 encloses an outer face 302 of a section of fuselage 301, thereby forming the outer chamber 101. The temperature-controlled air is directed across the outer face 302 of the section of fuselage 301 toward an air outflow aperture 104 in the outer chamber housing section 102.

At block 904, the method includes 900 directing humidity-controlled air into an inner chamber 201 through an air inflow aperture 203 of an inner chamber housing section 202. The inner chamber housing section 202 encloses an inner face 303 of the section of fuselage 301, thereby forming the inner chamber 201. The section of fuselage 301 separates the outer chamber 101 and the inner chamber 201. The inner chamber housing section 202 comprises an air outflow aperture 204 through which the humidity-controlled air is drawn from the inner chamber 201. The outer chamber housing section 102 and the inner chamber housing section 202 are connected to form an outer boundary 111 of a modular environmental control chamber 100.

Further, the method 900 may also involve determining a condensation rate of moisture in the inner chamber 201. In some cases, determining the condensation rate of moisture in the inner chamber 201 includes determining a rate of frost build-up in the inner chamber 201. For instance, frost may form on the inner face 303 of the section of fuselage 301 as the temperature of the outer chamber 101 is reduced. This may cause the section of fuselage 301 to have a temperature that is below both the dew point of the humidity-controlled air within the inner chamber and also the freezing point of water, resulting in the formation of frost.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. A modular environmental control chamber (MECC) comprising:
    an outer chamber formed by an outer chamber housing section enclosing an outer face of a section of fuselage, and wherein the outer chamber housing section comprises an air inflow aperture and an air outflow aperture;
    an inner chamber formed by an inner chamber housing section enclosing an inner face of the section of fuselage, wherein the inner chamber housing section comprises an air inflow aperture and an air outflow aperture, wherein the section of fuselage separates the outer chamber and the inner chamber, and wherein the outer chamber housing section and the inner chamber housing section are connected to form an outer boundary of the MECC;
    an outer chamber airflow delivery and return system comprising i) an outer chamber blower for directing temperature-controlled air to the outer chamber through the air inflow aperture of the outer chamber housing section and ii) an outer chamber air return duct connected to the air outflow aperture of the outer chamber housing section; and
    an inner chamber airflow delivery and return system comprising i) an inner chamber blower for directing humidity-controlled air to the inner chamber through the air inflow aperture of the inner chamber housing section and ii) an inner chamber air return duct connected to the air outflow aperture of the inner chamber housing section.

2. The MECC of claim 1, wherein the air inflow aperture of the outer chamber housing section is in fluid connection with an air inflow manifold on an inner surface of the outer chamber housing section, wherein the air inflow manifold comprises a first plurality of openings positioned to direct airflow from the air inflow aperture across the outer face of the section of fuselage toward the air outflow aperture of the outer chamber housing section.

3. The MECC of claim 2, wherein the first plurality of openings is positioned to direct airflow approximately tangential to the outer face of the section of fuselage.

4. The MECC of claim 1, wherein the air outflow aperture of the outer chamber housing section is in fluid connection with an air outflow manifold on an inner surface of the outer chamber housing section, and wherein the air outflow manifold comprises a second plurality of openings.

5. The MECC of claim 1, wherein the outer chamber airflow delivery and return system comprises a refrigerant for cooling the temperature-controlled air that is directed to the outer chamber through the air inflow aperture of the outer chamber housing section.

6. The MECC of claim 5, wherein the refrigerant comprises liquid nitrogen.

7. The MECC of claim 1, wherein the inner chamber airflow delivery and return system comprises a humidifier for conditioning the humidity-controlled air that is directed to the inner chamber through the air inflow aperture of the inner chamber housing section.

8. The MECC of claim 1, wherein the inner chamber airflow delivery and return system further comprises a dehumidifier for conditioning the humidity-controlled air that is directed to the inner chamber through the air inflow aperture of the inner chamber housing section.

9. The MECC of claim 1, wherein the air inflow aperture of the inner chamber is in fluid connection with an air inflow manifold within the inner chamber, and wherein the air inflow manifold comprises a first plurality of openings.

10. The MECC of claim 9, wherein the air outflow aperture of the inner chamber is in fluid connection with an air outflow manifold within the inner chamber, and wherein the air outflow manifold comprises a second plurality of openings.

11. The MECC of claim 1, wherein the outer face of the section of fuselage is convex, and wherein the outer chamber housing section is approximately parallel to the outer face of the section of fuselage.

12. The MECC of claim 11, wherein the outer chamber comprises an approximately uniform depth between the outer face of the section of fuselage and an inner surface of the outer chamber housing section, and wherein the depth is within a range of two to ten inches.

13. The MECC of claim 1, wherein the inner chamber housing section and the outer chamber housing section are removably connected.

14. The MECC of claim 1, wherein the section of fuselage encompasses an arc spanning at least ninety degrees.

15. A method of assembling a modular environmental control chamber (MECC) comprising:
  connecting an inner chamber housing section to a section of fuselage, wherein the inner chamber housing section and an inner face of the section of fuselage form an inner chamber, and wherein the inner chamber housing section comprises an air inflow aperture and an air outflow aperture;
  connecting an outer chamber housing section to the inner chamber housing section such that an outer face of the section of fuselage and the outer chamber housing section form an outer chamber, wherein the section of fuselage separates the inner chamber and the outer chamber, wherein the outer chamber housing section comprises an air inflow aperture and an air outflow aperture, and wherein the outer chamber housing section and the inner chamber housing section form an outer boundary of the MECC;
  connecting, to the air inflow aperture of the outer chamber housing section, an outer chamber airflow delivery and return system comprising an outer chamber blower for directing temperature-controlled air to the outer chamber through the air inflow aperture of the outer chamber housing section; and
  connecting, to the air inflow aperture of the inner chamber housing section, an inner chamber airflow delivery and return system comprising an inner chamber blower for directing humidity-controlled air to the inner chamber through the air inflow aperture of the inner chamber housing section.

16. The method of claim 15, further comprising:
  connecting an outer chamber air return duct to the air outflow aperture of the outer chamber housing section; and
  connecting an inner chamber air return duct to the air outflow aperture of the inner chamber housing section.

17. The method of claim 15 further comprising:
  connecting an air inflow manifold to the inner surface of the outer chamber housing section such that the air inflow manifold is in fluid connection with the air inflow aperture of the outer chamber housing section, wherein the air inflow manifold comprises a plurality of openings positioned to direct airflow from the air inflow aperture across the outer face of the section of fuselage toward the air outflow aperture of the outer chamber housing section.

18. A method of simulating environmental conditions in an aircraft comprising:
  directing temperature-controlled air into an outer chamber through an air inflow aperture of an outer chamber housing section, wherein the outer chamber housing section encloses an outer face of a section of fuselage thereby forming the outer chamber, and wherein the temperature-controlled air is directed across the outer face of the section of fuselage toward an air outflow aperture in the outer chamber housing section; and
  directing humidity-controlled air into an inner chamber through an air inflow aperture of an inner chamber housing section, wherein the inner chamber housing section encloses an inner face of the section of fuselage thereby forming the inner chamber, wherein the section of fuselage separates the outer chamber and the inner chamber, wherein the inner chamber housing section comprises an air outflow aperture through which the humidity-controlled air is drawn from the inner chamber, and wherein the outer chamber housing section and the inner chamber housing section are connected to form an outer boundary of a modular environmental control chamber.

19. The method of claim 18 comprising:
  determining a condensation rate of moisture in the inner chamber.

20. The method of claim 19 wherein determining the condensation rate of moisture in the inner chamber comprises determining a rate of frost build-up in the inner chamber.

* * * * *